United States Patent
Adams et al.

(10) Patent No.: US 7,406,879 B2
(45) Date of Patent: Aug. 5, 2008

(54) STATIC PRESSURE TUBE APPARATUS, METHOD, AND SYSTEM

(75) Inventors: Mark P. Adams, Madison, WI (US);
David M. Grimm, Verona, WI (US);
Jeffrey T. Sedlacek, Stoughton, WI (US); Christopher M. Cremeens, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 39 days.

(21) Appl. No.: 11/420,699

(22) Filed: May 26, 2006

(65) Prior Publication Data
US 2007/0272032 A1    Nov. 29, 2007

(51) Int. Cl.
*G01F 1/37* (2006.01)
(52) U.S. Cl. .................................. 73/861.52
(58) Field of Classification Search ............. 73/861.52, 73/861.66; 374/144; 123/548.12
See application file for complete search history.

(56) References Cited

U.S. PATENT DOCUMENTS

| | | | | |
|---|---|---|---|---|
| 3,553,403 A * | 1/1971 | Porwancher | ............ | 200/83 A |
| 4,196,849 A * | 4/1980 | Dehart et al. | ............ | 236/49.4 |
| 4,592,239 A * | 6/1986 | Cutler | ............ | 73/861.66 |
| 4,744,670 A * | 5/1988 | Janssen | ............ | 374/144 |
| 6,435,166 B1 * | 8/2002 | Sato et al. | ............ | 123/568.12 |

* cited by examiner

*Primary Examiner*—Jewel V Thompson
(74) *Attorney, Agent, or Firm*—Kunzler & McKenzie (57) ABSTRACT

An apparatus, system, and method for measuring static pressure in a warm gas flow while minimizing particulate deposit formation includes a housing containing the flow of gas, a pressure sensor, and a heated pressure sampling tube attached to the sensor, with the tube sampling the gas flow. The heated sampling tube reduces the temperature gradient between the gas and the tube, reducing thermophoretic forces that contribute to deposit formation. The sampling tube extends through the housing into the gas flow in one embodiment, enabling the gas to heat the tube and locating the open end of the tube in a higher-flow area of the gas, further reducing deposit formation.

25 Claims, 5 Drawing Sheets

STATIC PRESSURE TUBE APPARATUS, METHOD, AND SYSTEM

BACKGROUND OF THE INVENTION

1. Field of the Invention

This invention relates to gas measuring devices and methods, and more particularly to exhaust gas static pressure sensing devices and methods.

2. Description of the Related Art

It is desirable in various applications to measure the static pressure of a gas flowing through a housing. Static pressure sensors are common in engine exhaust streams, whether inside the engine or on the engine's aftertreatment system, to determine exhaust gas recirculation fraction, exhaust manifold pressure, or the pressure drop over an exhaust treatment device or backpressure caused by such a device. One such device is a diesel particulate filter, use of which is becoming more prevalent due to increasingly stringent environmental regulations of diesel engine emissions. Accurate static pressure readings are important for proper functioning of engine and aftertreatment system components, as inaccurate readings can result in engine or component failure.

Static pressure is measured by inserting a gas sampling tube into the wall of the housing, pipe, Venturi, or other component through which the exhaust gases are passing, the tube having one end, with an opening, at the wall and the other end operatively attached to a pressure sensor.

It is common to place static pressure sampling tubes upstream and downstream of a diesel particulate filter to determine the state of the filter, i.e., how much soot or other particulate matter has been captured by and is residing in the filter. Too much particulate matter can cause poor engine performance or uncontrolled particulate oxidation on the filter, damaging or destroying the filter and surrounding components.

Exhaust gases generally contain a wide variety of chemical constituents, including soot, hydrocarbons, water, oxides of carbon, and carboxilates, each of which can and often does come out of suspension and form a deposit on an exhaust train component. One of the problems associated with static pressure sampling tubes is the formation of deposits on their openings, skewing the static pressure sensed by the sensor attached to the tube. In the case of sampling tubes associated with diesel particulate filters, this can cause the engine controller to unduly delay regeneration of the filter (a controlled oxidation of the particulate matter on the filter), causing filter damage or failure.

SUMMARY OF THE INVENTION

The present invention has been developed in response to the present state of the art, and in particular, in response to the problems and needs in the art that have not yet been fully solved. Accordingly, the present invention has been developed to provide a static pressure tube apparatus, system, and method that overcomes many or all shortcomings in the art.

In one aspect of the invention, a static pressure measurement apparatus includes a passage configured to accommodate the flow of a gas and a static pressure sampling device disposed on the passage. The sampling device is operatively attached to a static pressure sensor configured to measure the static pressure of the gas. A thermal mechanism is provided, the thermal mechanism being configured to heat the static pressure tube.

In a further aspect of the invention, a static pressure measurement apparatus includes a housing defining a passage for the flow of gases and a static pressure tube having an opening, the static pressure tube being attached to a side of the housing at a connection point. The tube extends into the passage with the opening disposed within the flow of gases, such that the flow of gases around the static pressure tube raises the temperature of the tube.

In one embodiment, the gases are exhaust gases, with a particulate filter disposed downstream of the static pressure tube and a static pressure measurement device disposed downstream of the particulate filter, the device and the tube acting in concert to determine the static pressure drop across the particulate filter. A catalytic device capable of regeneration may be disposed upstream of the static pressure tube. Regeneration of the catalytic device raises the temperature of the exhaust gases and the static pressure tube, removing particulate buildup on the opening.

In one embodiment, a fitting is disposed at the connection point. The fitting includes an outer tube secured to the exterior of the static pressure tube, with the outer tube having a flare disposed at its bottom portion. A boss is attached to the housing for reception of the static pressure tube and outer tube, and a nut is disposed around the outer tube. The nut is configured to compress the flare against the boss.

In a further aspect of the invention, a method of measuring the static pressure of a gas flow includes urging the gas through a housing passage, the housing passage having an exterior wall, and sampling the gas at a sampling point located within the interior of the housing passage and a significant distance away from the exterior wall. In one embodiment, the method includes increasing the temperature of the gas and removing, through the increased temperature of the gas, particulate buildup accumulated at the sampling point.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are supplied to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
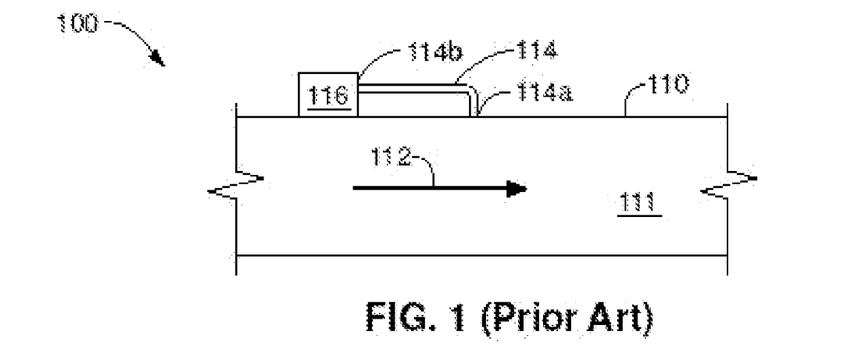
FIG. 1 is a cross-sectional view of a prior art static pressure tube apparatus.

FIG. 1 depicts a prior art gas static pressure apparatus 100 including a cylindrical gas flow housing 110 defining a flow passage 111, a gas flow through the housing indicated by the arrow 112, a static pressure tube 114 having a sampling end 114a disposed at a side of the housing 110, the sampling end 114a being open in order to sample the gas flowing through the passage 111. The other end 114b of the static pressure tube 114 is attached to a static pressure sensor 116, which senses the static pressure of the gas.

As is known in the art, a fluid tends to flow more slowly along the walls of its passage than in the center, making the center of the gas flow more rapid than the flow at the edges. Deposits tend to form more readily in low-flow areas, making the tube sampling end 114a, located on the edge of the flow, more susceptible to formation of deposits. In addition, there is little or no net flow through the interior of the length of the tube 114, making the open sampling end 114a further susceptible to deposit formation.

Exacerbating the problem, if the gas is warm or hot, the tube 114, including the opening 114a, will be cooler than the gas, since the tube 114 is located in the cooler ambient air as well as on the side of the housing 110, which is also cooler than the gas. This can make the open sampling end 114a further susceptible to deposit formation due to thermophoretic forces, i.e., forces applied to particles in a temperature gradient.

Figure 2:
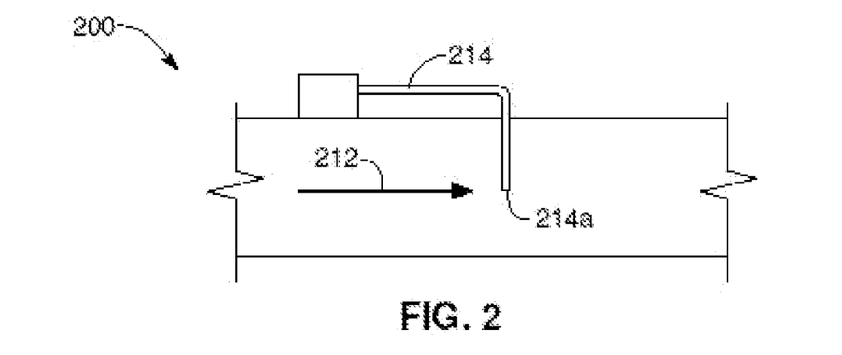
FIG. 2 is a cross-sectional view of an embodiment of a static pressure tube apparatus according to the present invention.

FIG. 2 depicts an embodiment of a gas static pressure apparatus 200 according to the present invention. The apparatus 200 is similar in construction to the apparatus 100 except that the static pressure tube 214 of the apparatus 200 extends into the gas flow 212, causing its sampling end 214a to be located well within the gas flow 212. In this embodiment, the hot gas flow 212 heats up the tube 214 to a temperature closer to the temperature of the gas flow 212 than if the tube 214 and opening 214a were configured as in FIG. 1. This reduces thermophoretic forces urging particles toward the opening and thus particulate deposition thereon. Additionally, the opening 214a is disposed at or near the center of the flow 212, in a high-flow area, further reducing deposit formation on the opening 214a.

Figure 3:
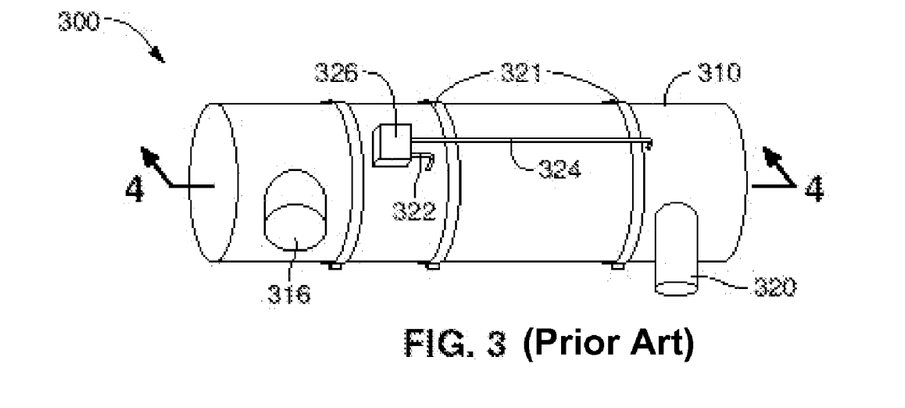
FIG. 3 is a perspective view of a prior art exhaust treatment and sensor apparatus.
Figure 4:
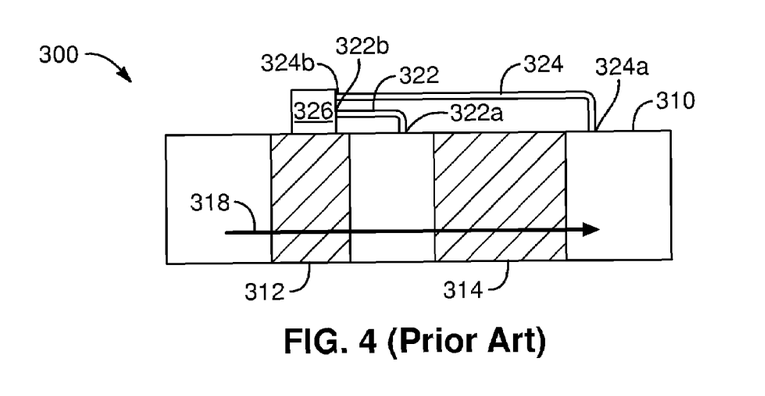
FIG. 4 is a cross-sectional view of the apparatus of FIG. 3 along line 4-4.

Referring now specifically to engine exhaust systems, FIGS. 3 and 4 illustrate a prior art exhaust treatment apparatus 300 including a housing 310 which contains a catalytic converter 312 and a diesel particulate filter 314. The housing 310 receives exhaust gases from a diesel engine (not shown) through an inlet 316, which pass through the housing 310, including the catalytic converter 312 and particulate filter 314, as well as other emission or acoustic treatment devices that may be included in the housing 310, generally in the direction of the arrow 318. While the general direction of the exhaust is as shown by the arrow 318, there will necessarily be some turbulence caused by components of the system, such as the catalytic converter 312, being inserted into the exhaust stream, as is known. The exhaust exits the housing 310 through an outlet 320, either to further treatment devices or to atmosphere. Mounts or clamps 321 are used on the housing 310 for structural purposes.

The apparatus 300 includes static pressure sampling tubes 322 and 324 disposed upstream and downstream, respectively, of the diesel particulate filter 314. Each tube 322 and 324 has a sampling end 322a and 324a disposed on the side of the housing 310, the sampling ends 322a and 324a comprising openings to sample the gas flow 318. The other ends of the tubes 322b and 324b are attached to a pressure sensor 326, which senses the pressure differential between the upstream and downstream sides of the particulate filter 314.

The gas contained in the tubes 322 and 324 is essentially still (non-moving), except for some movement and compression due to exhaust pulsations arising from engine operation, primarily the exhaust cycles of the pistons and cylinders, which causes some gas movement through the openings 322a and 324a.

As described in the background section, particulate deposits tend to form on the openings 322a and 324a due to exhaust gas components coming out of suspension and forming on the openings 322a and 324a due to lower flow rate near the wall of the housing 310 and thermophoretic forces resulting from the temperature gradient between the hot gas 318 and cooler housing 310 and tubes 322 and 324.

The rate of particulate deposition on the openings 322a and 324a will depend on factors including engine size, exhaust gas temperature, and ambient temperature, i.e., outside air temperature. The larger the engine, generally, the more exhaust and pollutants produced, with correspondingly higher deposition rates. Deposition rates also rise as ambient temperatures drop, since colder ambient temperatures create more of a temperature gradient between the gas flow 318 and the housing 310 and tubes 322 and 324.

A primary indicator of particulate deposition rate on the tube sampling end 322a, then, is the following equation:

$$\Delta T/T \qquad \text{(Equation 1)}$$

Where ΔT is the temperature difference between the sampling end 322a and the gas 318 (temperature gradient), and T is the overall temperature.

Generally, particulate deposits are more of a problem on the upstream sampling tube 322 than the downstream tube 324, since the particulate filter 314 removes many or most of the particulates and other deposit-forming substances in the exhaust before the exhaust reaches the downstream tube 324.

Figure 5:
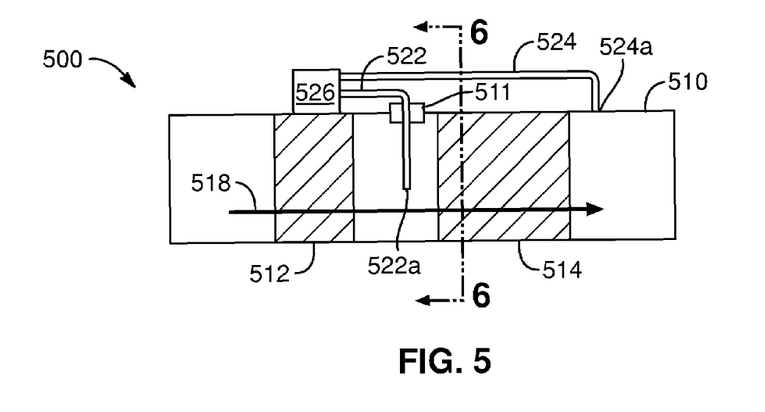
FIG. 5 is a cross-sectional view of an embodiment of an exhaust treatment and sensor apparatus according to the present invention.
Figure 6:
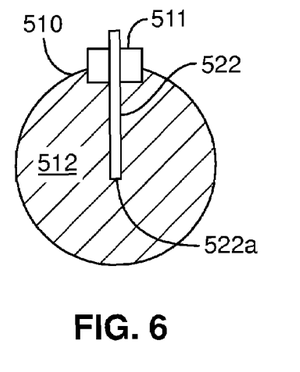
FIG. 6 is a cross-sectional view of the apparatus of FIG. 5 along line 6-6.

FIGS. 5 and 6 illustrate an embodiment of a static pressure sampling apparatus 500 according to the present invention. The apparatus 500 is similar in construction to the apparatus 300, except that instead of the upstream static pressure tube 322 that terminates at 322a at the wall of the housing 310, the apparatus 500 has an upstream static pressure tube 522 that extends into the interior of the housing 510 through a fitting 511, into the gas flow 518, causing its open sampling end 522a to be located within the gas flow 518. In this embodiment, the hot gas flow 518 heats up the tube 522 to a temperature closer to the temperature of the gas flow 518 than if the tube 522 and opening 522a were configured as in FIGS. 3 and 4. This reduces thermophoretic forces urging particles toward the opening 522a and thus particulate deposition thereon. Additionally, the opening 522a is disposed at or near the center of the flow 518, in a high-flow area, further reducing deposit formation on the opening 522a. The downstream sampling tube 524 may or may not be configured similarly to the sampling tube 522, since there will be fewer particulates and exhaust constituents available to form deposits on the opening 524a after the exhaust goes through the particulate filter 514, lessening the need to inhibit deposit formation thereon.

Figure 7:
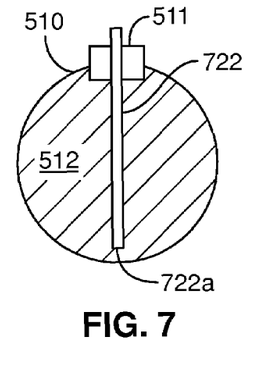
FIG. 7 is a cross-sectional view of another embodiment of an exhaust treatment and sensor apparatus according to the present invention.

The sampling tube end 522a may be situated in other locations than the center of the gas flow 518 while still retaining the benefits of the invention. FIG. 7 shows an embodiment of the invention (viewed at the same orientation and location as FIG. 6) that is similar in all respects to the apparatus 500 except that its upstream sampling tube 722 extends almost all the way across the interior diameter of the housing 510, such that its open sampling end 722a is disposed near the opposite side of the housing 510 from where the tube 722 enters the housing 510. While the flow of the exhaust 518 may be slower in the area of the sampling end 722a, the arrangement shown in FIG. 7 still provides for the heating of the tube 722, through interaction with the hot exhaust gas 518, reducing thermophoretic forces and corresponding particulate deposition.

Figure 8:
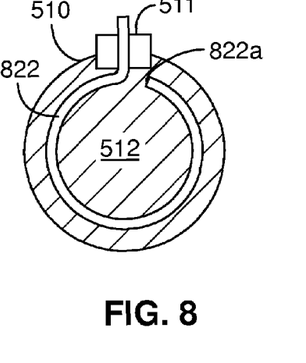
FIG. 8 is a cross-sectional view of another embodiment of an exhaust treatment and sensor apparatus according to the present invention.

The scope of the invention also includes embodiments such as that depicted in FIG. 8, which is similar in all respects to the apparatus 500 except that its upstream sampling tube 822, instead of extending radially straight into the interior of the housing 510, curves around the interior near the wall of the housing 510, ending at an open sampling end 822a disposed near the point at which the sampling tube 822 enters the housing 510. Even though the sampling end 822a is not far from the locations at which existing sampling tubes have their openings (such as the open end 322a shown in FIG. 4), fewer deposits will form on the opening 822a. A significant portion of the tube 822 is disposed within the interior of the housing 510, providing for the heating of the tube 822—together with its open sampling end 822a—through interaction with the hot exhaust gases, reducing thermophoretic forces.

Embodiments such as that shown in FIG. 8 may be desirable when, for example, the housing 510 has a small diameter, requiring curvature of the tube 822 in the interior of the housing 510 in order to expose a significant portion of the tube 822 to the exhaust gas stream 518.

What is considered a "significant" portion of the tube extending into the interior of the housing depends on the particular application and desired characteristics of the system. As will be apparent to those skilled in the art in light of this disclosure, any portion of the tube beyond a de minimus portion used for attachment to the housing—that is, any portion of the tube that is extended into the interior of the housing for the specific purpose of benefiting from heating from the exhaust gases—will serve to lessen deposit formation somewhat and can thus be considered "significant." In one application, if the outer diameter of the sampling tube is 5/16ths of an inch, experiments have shown significant benefit from placing at least 3 inches of the tube within the interior of the housing, though a smaller length will also provide some benefit.

Figure 9:
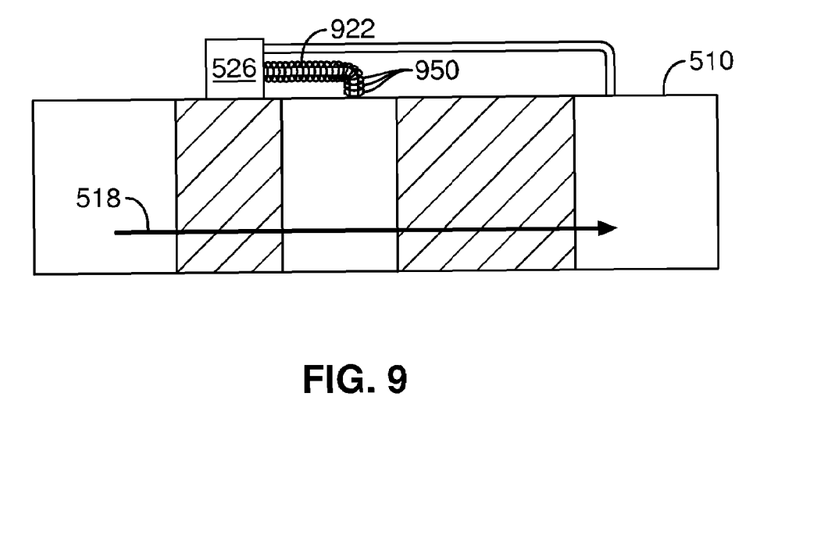
FIG. 9 is a cross-sectional view of another embodiment of an exhaust treatment and sensor apparatus according to the present invention.

Embodiments of the present invention described thus far provide for reduction of thermophoretic forces through heating of the upstream sampling tube, that heating being carried out by placing a significant portion of the sampling tube within the interior of the exhaust housing. The heating, however, may be carried out in other ways while remaining within the scope of the invention, such as in the embodiment shown in FIG. 9. The apparatus shown in FIG. 9 is similar in all respects to the apparatus 500, except that instead of having the upstream sampling tube extending into the interior of the housing 510, the upstream sampling tube 922 of the apparatus in FIG. 9 has an open sampling end 922a which ends at the wall of the housing 510, as in existing apparatuses. A heating wire 950 is coiled around the tube 922 between the static pressure sensor 926 and the housing 510, heating the tube 922 and its corresponding sampling end 922a, reducing thermophoretic forces and deposit formation from the gas 518 to the sampling end 922a. Other thermal mechanisms configured to heat the upstream sampling tube can also be used while remaining within the scope of the invention.

Heating the tube 922 with the wire 950 may require more elaborate equipment to implement than extension of the tube into the interior of the housing, as shown in FIG. 5, but may also have certain advantages, such as an ability to heat the tube 922 to a precise temperature within a wide range rather than relying on the temperature of the exhaust 518. The apparatus shown in FIG. 9 allows for heating of the tube 922 to a temperature even exceeding that of the exhaust 518, creating reverse thermophoretic forces.

Figure 10:
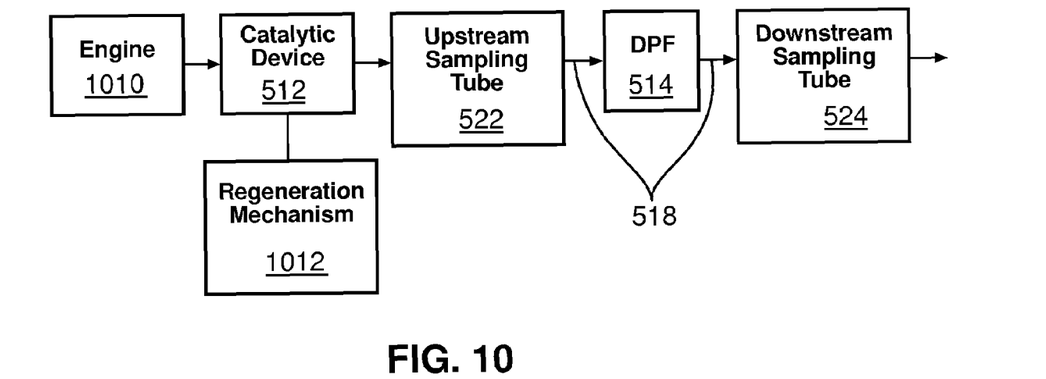
FIG. 10 is a schematic view of an embodiment of an exhaust treatment and sensor system according to the present invention.

FIG. 10 is a schematic diagram of the apparatus 500 operatively attached to an engine 1010, which produces exhaust that is catalyzed by the catalytic converter 512. The exhaust travels as indicated by the arrows 518 past the upstream static pressure sampling tube 522, through the diesel particulate filter 514, past the downstream static pressure sampling tube 524, and thence to atmosphere. Other components or devices, not shown, may be included in the exhaust treatment system. A regeneration mechanism 1012 is operatively attached to the catalytic device 512, with the purpose of regenerating the device 512. Generally, regeneration comprises heating the device 512 to a temperature such that accumulated substances on the device 512 are wholly or partially oxidized or otherwise removed. As is known, regeneration requires an increase in temperature, and is often carried out by the regeneration mechanism 1012 initiating dosing, meaning an injection of fuel or other inflammable substance into the exhaust stream, heating the gas and regenerating the device 512. The dosing can be carried out at a range of points along the exhaust stream, such as in the engine 1010's turbocharger or even inside the cylinders. Such regenerations can also be accomplished together or separately with regenerations of the diesel particulate filter 514.

Regenerations of the device 512 may also occur spontaneously, depending on the application. Systems used in over-the-road trucks, for example, may reach regeneration temperatures without dosing.

Regeneration of the catalytic device 512, either through initiation of regeneration by the regeneration mechanism 1012 or spontaneously, raises the temperature of the interior of the housing 510 downstream of the device 512, serving to regenerate the open sampling end 522a of the sampling tube 522 as well. It is likely that some deposit formation will occur on the sampling end 522a even though deposits will be reduced compared to existing apparatuses. Given its location within the exhaust gas stream 518, the sampling end 522a will benefit from temperatures resulting from the regenerating catalytic device 512 and oxidize or otherwise remove deposits that have formed.

As previously described, tube sampling end locations in various locations of the gas stream will benefit from the temperatures of the gas stream, both separate from and during regeneration, though the benefits may vary as the temperatures vary radially within the housing 510. Additionally, the tube sampling opening 522a may be regenerated in other locations than downstream of the catalytic device 512, such as downstream of any exhaust treatment component that is being regenerated, or simply within the exhaust stream, regeneration occurring when the exhaust temperature is raised because of high engine load or other factors.

Figure 11:
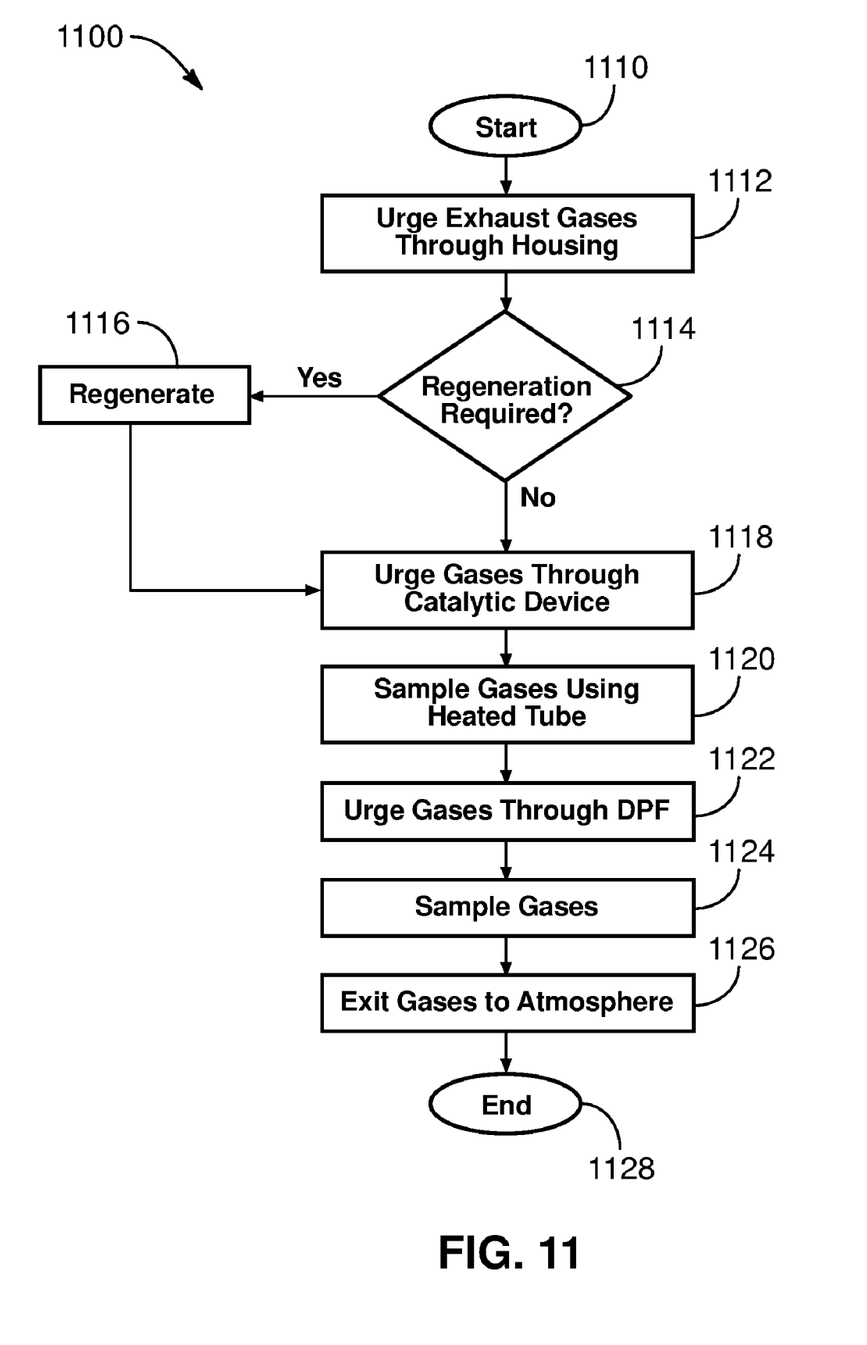
FIG. 11 is a schematic flow chart diagram illustrating an embodiment of an exhaust treatment, sensing, and regenerating method according to the present invention.

The schematic flow chart diagram that follows, as well as the preceding schematic diagram, is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 11 illustrates an embodiment of a method 1100 of measuring static pressure according to the present invention. The method 1100 depicts an embodiment used for measuring static pressure of exhaust gases produced by a diesel engine, but may be generalized for use in any gas flow. As shown, the method 1100 begins in a block 1110, and the exhaust gases are urged through an exhaust housing, block 1112, such as the housing 510. A controller or other device or person then determines whether regeneration of the catalytic device 512 is required, block 1114. If yes, then regeneration of the device is initiated, block 1116, resulting in regeneration of the sampling tube end 522a as well. Such regeneration may also occur spontaneously from operation of the engine. After regeneration is initiated, or if regeneration is not required, the exhaust gases are urged through the catalytic device 512, block 1118, and are then sampled using a tube heated by the gases, block 1120, with the open end of the tube, such as sampling tube end 522a, being disposed a significant distance within the interior of the housing 510, as measured by the length of the tube 522 between the end 522a and the point where the tube 522 connects to the housing 510.

After static pressure sampling, the gases are urged through the diesel particulate filter 514, block 1122, the gases are again sampled by the tube 524, block 1124, with the sensor 526 determining the pressure drop across the filter 514 due to the pressure sampling from the tubes 522 and 524, the gases exit to atmosphere, block 1126, and the method ends 1128.

The method 1100 may be simplified in other applications. For example, if it is desired merely to measure the static pressure of a flowing gas, the method will comprise simply urging the gas through a passage or housing, and sampling the gas at a point located within the gas flow, or using a heated tube.

Figure 12:
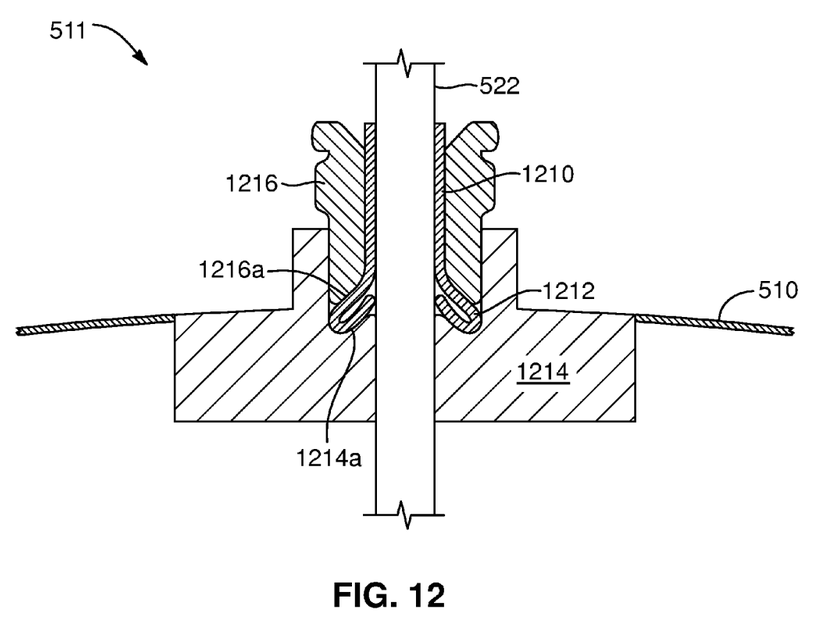
FIG. 12 is a cross-sectional view of an embodiment of a pressure tube/housing fitting according to the present invention.

FIG. 12 shows further detail of one embodiment of the fitting 511 (shown in FIG. 5) according to the present invention, the fitting 511 being used at the attachment point of the tube 522 and the housing 510. The fitting 511 comprises the tube 522 and an outer tube 1210, which is welded or brazed onto the exterior of the tube 522. The bottom portion of the outer tube 1210 includes a flare 1212. In the shown embodiment of the flare 1212, the tube 1210 extends outwardly and downwardly before doubling back on itself, making it a double or double-layered flare. Other embodiments are possible, such as a simple extension outward and downward (single flare), or an additional doubling back (triple flare).

A boss 1214 is welded or otherwise securely attached to the housing 510, and a nut 1216 is disposed around the outer tube 1210. To secure the attachment point, the nut 1216 is screwed downwardly into the boss 1214, the nut 1216 and boss 1214 being appropriately threaded for the purpose, and onto the double flare 1212, compressing the flare 1212 and preventing gases from inside the housing 510 from escaping through the fitting 511. The bottom of the nut 1216a and the portion of the boss 1214a are angled for close engagement with the flare 1212.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A static pressure measurement apparatus, the apparatus comprising:
   a housing defining a passage for the flow of exhaust gases from an internal combustion engine;
   a static pressure tube having an opening, the static pressure tube being attached to a side of the housing at a connection point and extending into the passage such that the opening is disposed within the flow of gases;
   wherein the flow of exhaust gases around the static pressure tube transfers heat and raises the temperature of the tube.

2. The apparatus of claim 1, wherein the opening is disposed at least 3 inches from the connection point, measuring along the static pressure tube.

3. The apparatus of claim 1, wherein the housing is cylindrical and the static pressure tube extends radially into the passage.

4. The apparatus of claim 1, further comprising a particulate filter disposed downstream of the static pressure tube, and a static pressure measurement device disposed downstream of the particulate filter, the device and the tube acting in concert to determine the static pressure drop across the particulate filter.

5. The apparatus of claim 4, further comprising a catalytic device disposed upstream of the static pressure tube, the catalytic device being capable of regeneration, wherein regeneration of the catalytic device raises the temperature of the exhaust gases and the static pressure tube, removing particulate buildup on the opening.

6. The apparatus of claim 1, further comprising a fitting disposed at the connection point, the fitting comprising an outer tube secured to the exterior of the static pressure tube, the outer tube including a flare disposed at the bottom portion of the outer tube, the fitting further comprising a boss attached to the housing for reception of the static pressure tube and outer tube, and a nut disposed around the outer tube, the nut being configured to compress the flare against the boss.

7. The apparatus of claim 6, wherein the flare comprises a double flare.

8. A static pressure measurement apparatus, the apparatus comprising:
a passage configured to accommodate the flow of an exhaust gas from an internal combustion engine;
a static pressure sampling device disposed on the passage, the sampling device operatively attached to a static pressure sensor configured to measure the static pressure of the exhaust gas;
a thermal mechanism configured to heat the static pressure sampling device.

9. The apparatus of claim 8, wherein the sampling device comprises a static pressure tube, a significant portion of the static pressure tube extending into the interior of the passage and within the gas flow, the gas flow being hot relative to the static pressure tube, and wherein the thermal mechanism comprises the interaction of the gas flow with the significant portion of the static pressure tube.

10. The apparatus of claim 9, wherein the significant portion of the static pressure tube comprises at least 3 inches of the length of the tube.

11. The apparatus of claim 9, further comprising a regeneration mechanism operatively attached to the gas flow, the regeneration mechanism configured to increase the temperature of the gas flow and regenerate the static pressure tube.

12. The apparatus of claim 9, further comprising a housing defining the passage, the static pressure tube being connected to the housing at a connection point, and a fitting disposed at the connection point, the fitting comprising an outer tube secured to the exterior of the static pressure tube, the outer tube including a flare disposed at the bottom portion of the outer tube, the fitting further comprising a boss attached to the housing for reception of the static pressure tube and outer tube, and a nut disposed around the outer tube, the nut being configured to compress the flare against the boss.

13. The apparatus of claim 12, wherein the flare comprises a double flare.

14. A method of measuring the static pressure of an exhaust gas flowing from an internal combustion engine, the method comprising:
urging the exhaust gas from the internal combustion engine through a housing passage, the housing passage having an exterior wall;
sampling the exhaust gas at a sampling point located within the interior of the housing passage and a significant distance away from the exterior wall.

15. The method of claim 14, wherein the gas is sampled at a sampling point disposed at least 3 inches from the exterior wall.

16. The method of claim 14, further comprising increasing the temperature of the gas and removing, through the increased temperature of the gas, particulate buildup accumulated at the sampling point.

17. The method of claim 15, wherein increasing the temperature of the gas comprises initiating regeneration of a gas treatment component disposed upstream of the sampling point.

18. An exhaust gas static pressure measurement system for an internal combustion engine, the system comprising:
an exhaust gas housing configured to accommodate the flow of exhaust gases from an internal combustion engine;
an elongate static pressure measurement tube disposed through a side of the housing at a connection point, the measurement tube having first and second ends, the measurement tube extending into the interior of the housing such that the first end is disposed in the interior of the housing;
an opening disposed on the first end of the measurement tube, the opening configured to sample the exhaust gases, and a significant portion of the measurement tube being disposed between the opening and the housing;
a static pressure sensor operatively connected to the second end of the measurement tube, the sensor configured to sense the static pressure of the exhaust gases.

19. The system of claim 18, further comprising the engine producing the exhaust gas, the engine operatively attached to the exhaust gas housing.

20. The system of claim 18, wherein the housing is cylindrical and the measurement tube extends radially into the interior of the housing.

21. The system of claim 18, further comprising a fitting disposed at the connection point, the fitting comprising an outer tube secured to the exterior of the measurement tube, the outer tube including a flare disposed at the bottom portion of the outer tube, the fitting further comprising a boss attached to the housing for reception of the measurement tube and outer tube, and a nut disposed around the outer tube, the nut being configured to compress the flare against the boss.

22. The system of claim 21, wherein the flare comprises a double flare.

23. An exhaust gas static pressure measurement system, the system comprising:
an exhaust gas housing configured to accommodate the flow of exhaust gases;
an elongate static pressure measurement tube disposed through a side of the housing at a connection point, the measurement tube having first and second ends, the measurement tube extending into the interior of the housing such that the first end is disposed in the interior of the housing;
an opening disposed on the first end of the measurement tube, the opening configured to sample the exhaust gases, and a significant portion of the measurement tube being disposed between the opening and the housing;
a static pressure sensor operatively connected to the second end of the measurement tube, the sensor configured to sense the static pressure of the gases; and a catalytic device disposed upstream of the measurement tube and a particulate filter disposed downstream of the measurement tube.

24. The system of claim 23, further comprising a static pressure measurement device disposed on the housing downstream of the particulate filter, the static pressure measurement device operatively connected to the static pressure sensor, wherein the difference between the static pressure measured by the measurement tube and the static pressure measured by the measurement device indicates the pressure drop across the particulate filter.

25. The system of claim 23, further comprising a regeneration mechanism configured to regenerate the catalytic device, wherein regeneration of the catalytic device heats the exhaust gas and regenerates the opening.

* * * * *